(12) United States Patent
Yang et al.

(10) Patent No.: US 7,288,593 B2
(45) Date of Patent: Oct. 30, 2007

(54) ENHANCED OXYGEN BARRIER PERFORMANCE FROM MODIFICATION OF ETHYLENE VINYL ALCOHOL COPOLYMERS (EVOH)

(75) Inventors: Hu Yang, San Ramon, CA (US); Ta Yen Ching, Novato, CA (US); Gangfeng Cai, Danville, CA (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 11/484,177

(22) Filed: Jul. 10, 2006

(65) Prior Publication Data

US 2006/0251841 A1 Nov. 9, 2006

Related U.S. Application Data

(63) Continuation of application No. 10/600,010, filed on Jun. 19, 2003, now Pat. No. 7,087,277, which is a continuation of application No. 09/851,537, filed on May 8, 2001, now abandoned.

(60) Provisional application No. 60/205,999, filed on May 19, 2000.

(51) Int. Cl.
*C08G 63/48* (2006.01)
(52) U.S. Cl. .......................... 525/57; 525/61
(58) Field of Classification Search .................. 525/57, 525/61
See application file for complete search history.

(56) References Cited

U.S. PATENT DOCUMENTS

| | | | |
|---|---|---|---|
| 2,238,447 A | 4/1941 | Overbaugh | 260/66 |
| 3,497,571 A | 2/1970 | Tellier et al. | 260/844 |
| 3,536,687 A | 10/1970 | Nordstrom | 260/89.5 |
| 4,415,710 A | 11/1983 | Barnabeo et al. | 525/370 |
| 4,524,201 A | 6/1985 | Barnabeo et al. | 528/395 |
| 4,743,409 A | 5/1988 | Nomura et al. | 264/1.3 |
| 5,116,916 A | 5/1992 | Young | 525/350 |
| 5,211,875 A | 5/1993 | Speer et al. | 252/188.28 |
| 5,346,644 A | 9/1994 | Speer et al. | 252/188.28 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,736,616 A | 4/1998 | Ching et al. | 525/330.3 |
| 5,776,361 A | 7/1998 | Katsumoto et al. | 252/188.28 |
| 5,837,158 A | 11/1998 | Shepodd et al. | 252/181.6 |
| 5,859,145 A | 1/1999 | Ching et al. | 525/330.6 |
| 6,057,013 A | 5/2000 | Ching et al. | 428/35.7 |
| 6,063,307 A | 5/2000 | Shepodd et al. | 252/181.6 |
| 6,254,803 B1 | 7/2001 | Matthews et al. | 252/188.28 |
| 6,254,804 B1 | 7/2001 | Matthews et al. | 252/188.28 |

FOREIGN PATENT DOCUMENTS

| | | |
|---|---|---|
| EP | 0 751 153 A1 | 1/1997 |
| JP | 62141003 | 6/1987 |
| WO | WO99/48963 | 9/1999 |

OTHER PUBLICATIONS

PCT/US01/16040 International Search Report (Jan. 9, 2002).
Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1-8 (Chicago, Jun. 19-20, 2000).
Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19-20, 2000).

*Primary Examiner*—Bernard Lipman
(74) *Attorney, Agent, or Firm*—Mark B. Quatt

(57) ABSTRACT

Herein is disclosed a modified ethylene vinyl alcohol polymer (EVOH) comprising an oxygen scavenging functional group. Preferably, the modified EVOH comprises structures IV, V, and VI:

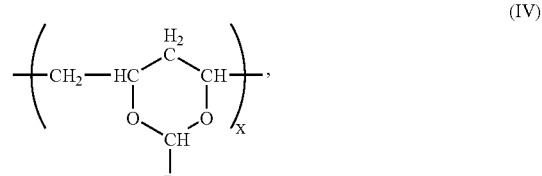

(IV)

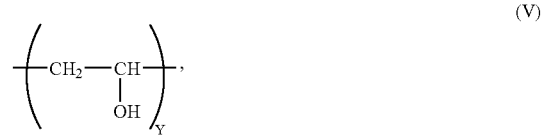

(V)

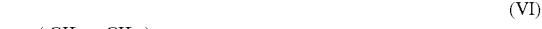

(VI)

wherein x is an integer greater than or equal to 1, y is an integer greater than or equal to 1, z is an integer greater than or equal to 1, and R comprises a cycloalkenyl group.

The modified EVOH is useful in oxygen barrier applications, such as a forming an oxygen barrier layer of a packaging article.

Also disclosed are methods of modifying ethylene vinyl alcohol polymers, and using the modified EVOH to make packaging articles with a superior barrier to entry by atmospheric oxygen.

11 Claims, No Drawings

ENHANCED OXYGEN BARRIER PERFORMANCE FROM MODIFICATION OF ETHYLENE VINYL ALCOHOL COPOLYMERS (EVOH)

The present application is a continuation of U.S. patent application Ser. No. 10/600,010, filed Jun. 19, 2003, now U.S. Pat. No. 7,087,277, which is a continuation of U.S. patent application Ser. No. 09/851,537, filed May 8, 2001, now abandoned, which claims priority from U.S. Provisional Patent Application 60/205,999, filed May 19, 2000. These U.S. Applications are hereby incorporated by reference in their entirety.

BACKGROUND OF THE INVENTION

1. Field of the Invention

The present invention relates generally to the field of high oxygen barrier polymers. More particularly, it concerns a modified poly(ethylene vinyl alcohol) (EVOH), or blends comprising the modified EVOH, used as an oxygen barrier for food and beverage packaging applications, methods of making the modified poly(ethylene vinyl alcohol), packaging articles comprising the modified poly(ethylene vinyl alcohol), and methods of making the packaging articles.

2. Description of Related Art

It is well known that limiting the exposure of oxygen-sensitive products to oxygen maintains and enhances the quality and shelf-life of the product. For instance, by limiting the oxygen transmission from environment into the oxygen sensitive food products in a packaging system, the quality of the food product is maintained, and food spoilage is avoided. In addition, high oxygen barrier packaging also keeps the product in inventory longer, thereby reducing costs incurred from waste and restocking.

Plastics continue to expand into food packaging applications traditionally served by metal and glass materials. An important packaging application area for polymeric materials is in packaging oxygen-sensitive food and beverage products. Polymers used for these applications, either as films or rigid containers, can be classified by their relative permeation to oxygen. Of the many classes of polymers, for such applications, those generally held to be high oxygen barrier materials include poly(ethylene vinyl alcohol) (EVOH), poly(vinylidene chloride) (PVDC), and acrylonitrile polymer (PAN). The barrier polymers generally classified as moderate to intermediate include aromatic nylon MXD-6 (Mitsubishi Gas Chemical) and amorphous nylon Selar PA (Du Pont). Among the high oxygen barrier resins, the use of poly(ethylene vinyl alcohol) (EVOH) copolymers shows the most rapid growth. EVOH is commercially available in several grades with different ratios of ethylene/vinyl alcohol in the polymer chain (Eval, Selar-OH, Sarnol). Familiar containers comprising an EVOH oxygen barrier include squeezable bottles (e.g. for ketchup or other condiments), shelf-stable entree container, and, more recently, beer bottles. However, the oxygen barrier properties of high barrier polymers, such as EVOH, are still frequently not as high as glasses or metals for a wide range of packaging applications. This performance gap between high barrier polymers and glasses or metals represents a tremendous opportunity in both rigid and flexible packaging applications; this has prompted intensive effort in the field to improve the oxygen barrier performance for EVOH barrier materials.

One approach to improve oxygen barrier performance of EVOH copolymers is to incorporate platelet-type fillers into ethylene vinyl alcohol copolymers (T. C. Bissot, "Performance of High-Barrier Resins with Platelet-Type Fillers," in *Barrier Polymers and Structures, ACS Symposium Series* 423 (1990), William J. Koros, Ed.). With such a composition, the oxygen barrier performance is increased approximately three-fold. The benefit is ascribed to the increased diffusion path length at the same layer thickness (tortuous path) produced by overlapping platelets obtained from orientation during processing. However, its improved barrier performance is critically dependent on the process (e.g. orientation of the platelet fillers in the EVOH matrix), and oxygen barrier performance is still not as strong as that seen for glasses and metals.

The recent development of oxygen scavenging technology has attracted significant commercial interest in the food and beverage packaging industry. With this technology, headspace oxygen in the filled package can be quickly removed by an oxygen scavenging polymer component in the packaging structure. In such a packaging structure, the headspace oxygen is consumed by the reaction between oxygen and the oxygen scavenging polymer. The reaction is often catalyzed by a transition metal salt, such as cobalt oleate. In such a system, the packaging article is typically designed to allow an efficient diffusion of headspace oxygen into the oxygen scavenging polymer in order to effect the desired oxygen scavenging reaction (oxidation), and the oxygen barrier property against ingress oxygen often relies on additional oxygen barrier layers in the packaging structures, such as aluminum foil in a juice carton packaging structures.

From this, it will be recognized that a superior oxygen barrier polymer with performance competitive with glasses and metals is extremely important to the packaging industry. Desirably, such a superior oxygen barrier polymer system would provide an extremely high oxygen barrier, or virtually zero oxygen diffusion. It would also be desirable for the superior oxygen barrier polymer to have improved moisture resistance, improved processability, or improved interlayer adhesion.

Ching et al., WO 99/48963, showed an acrylate polymer comprising a cyclohexene moiety is very efficient in removing headspace oxygen in a packaging article. 1-cyclohexene-3-methanol was chemically linked to an ethylene methyl acrylate copolymer by a catalyzed ester exchange reaction. However, ethylene methyl acrylate is generally not regarded as being an oxygen barrier polymer.

Beer in PET, Part I of III (Packaging Strategies, Inc., eds., West Chester, Pa.) (1999), reports the reputed testing of a blend of an oxygen scavenger and an ethylene/vinyl alcohol copolymer (EVOH) in a packaging article for packaging beer. The identity of the oxygen scavenger, and the proportions of the oxygen scavenger and EVOH in the blend, were not reported. Further, this reference also does not disclose any chemical modification of EVOH.

SUMMARY OF THE INVENTION

In one embodiment, the present invention relates to an oxygen barrier composition, comprising a modified ethylene vinyl alcohol polymer comprising an oxygen scavenging functional group. Preferably, the modified ethylene vinyl alcohol comprises structure I:

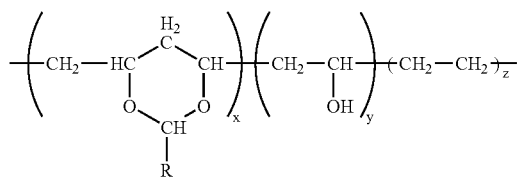

(I)

wherein x is an integer greater than or equal to 1, y is an integer greater than or equal to 0, and z is an integer greater than or equal to 0; and R is a cycloalkenyl group.

In another embodiment, the present invention is directed to a packaging article comprising a high oxygen barrier layer, wherein the high oxygen barrier layer comprises a modified ethylene vinyl alcohol polymer as given above.

In a further embodiment, the present invention relates to a method of making a modified ethylene vinyl alcohol polymer as given above, comprising (i) providing (a) a ethylene/vinyl alcohol copolymer (EVOH); (b) an aldehyde; and (c) a catalyst; and (ii) reacting the EVOH and the aldehyde in the presence of the catalyst under temperature and pressure sufficient to form the modified ethylene vinyl alcohol polymer.

In still another embodiment, the present invention relates to a method of forming a packaging article with at least a high oxygen barrier layer comprising the modified ethylene vinyl alcohol polymer as given above. The method comprises (i) providing an oxygen barrier composition comprising the modified ethylene vinyl alcohol polymer and (ii) forming the oxygen barrier composition into the packaging article or a high oxygen barrier layer thereof.

The present invention provides packaging articles that have a very strong oxygen barrier for a long period of time, by taking advantage of the inherent oxygen barrier property of the EVOH backbone of the modified ethylene vinyl alcohol polymer and the oxygen scavenging property of the oxygen scavenging functional groups of the modified ethylene vinyl alcohol polymer. The present invention also provides a packaging article having the advantage of providing a $CO_2$ barrier (useful in retaining the carbonation of packaged soft drinks, beer, and sparkling wines). The modified EVOH polymer has good clarity and improved moisture resistance and is readily processible into a variety of formulations.

DESCRIPTION OF ILLUSTRATIVE EMBODIMENTS

In one embodiment, the present invention is directed to an oxygen barrier composition comprising a modified ethylene vinyl alcohol polymer comprising a pendant oxidizable group. Preferably, the modified ethylene vinyl alcohol polymer comprises structure I:

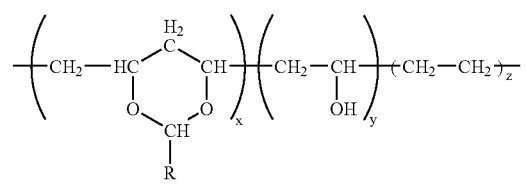

(I)

wherein x is an integer greater than or equal to 1, y is an integer greater than or equal to 0, and z is an integer greater than or equal to 0; and R is a cycloalkenyl group. Preferably, R has structure II:

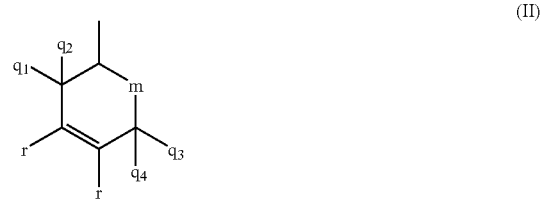

(II)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

Preferably, y is greater than or equal to 1, and z is greater than or equal to 1. In a preferred embodiment, the cycloalkenyl group is cyclohexenyl (i.e. in structure II, n is 1 and $q_1$, $q_2$, $q_3$, $q_4$, and r are each hydrogen).

An alternative way of defining the preferred polymer of the present invention is as a polymer, comprising structures IV, V, and VI:

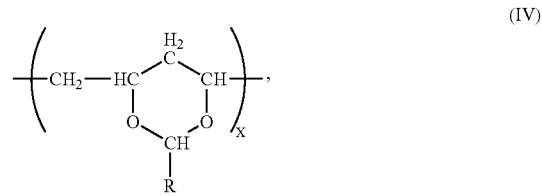

(IV)

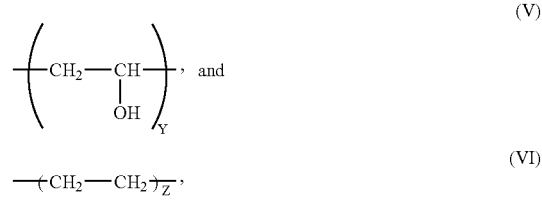

(V)

and

(VI)

wherein x is an integer greater than or equal to 1, y is an integer greater than or equal to 1, z is an integer greater than or equal to 1, and R is a cycloalkenyl group. Preferably, R has structure II:

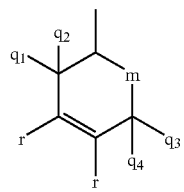

(II)

wherein $q_1$, $q_2$, $q_3$, $q_4$, and r are independently selected from hydrogen, methyl, or ethyl; m is $—(CH_2)_n—$, wherein n is an integer from 0 to 4, inclusive; and, when r is hydrogen, at least one of $q_1$, $q_2$, $q_3$, and $q_4$ is also hydrogen.

In our effort to develop EVOH polymers with superior oxygen barrier properties, we modified the EVOH polymer structure by incorporating a desirable amount of an oxygen scavenging functional group onto EVOH polymer. Hence, "modified ethylene vinyl alcohol polymer" or "modified EVOH" refers to an EVOH polymer into which has been incorporated an oxygen scavenging functional group. An "unmodified EVOH" is an ethylene vinyl alcohol polymer lacking an oxygen scavenging functional group. As a result, a significantly improved oxygen barrier can be achieved by a combination of the inherent physical barrier function of EVOH polymer and an added oxygen scavenging function (active barrier) capable of consuming the fraction of otherwise diffusible ingress oxygen through the EVOH backbone. The combination may be within the modified EVOH molecule, within a blend comprising the modified EVOH and an unmodified EVOH, or both. Though not to be bound by theory, it is believed the oxygen barrier performance can be significantly improved if the introduced oxygen-scavenging rate is sufficiently faster than the oxygen diffusion rate in the resulting polymer. To the best of our present knowledge, the modified EVOH will be the first to enhance the barrier performance of high oxygen barrier polymer by taking advantage of the contribution from an oxygen scavenging functional group covalently linked to the EVOH backbone.

It is desirable that such a structural modification should have a minimum impact on the physical barrier property characteristic to EVOH. The oxygen scavenging function (active barrier) introduced will be most efficient for enhancing the oxygen barrier performance only if the physical barrier property of EVOH polymer is largely retained.

In a modified ethylene vinyl alcohol polymer of the present invention, the weight fraction of the R groups will typically be in the range of about 1 wt % to about 30 wt %.

As stated above, the modified ethylene vinyl alcohol polymer is a component of an oxygen barrier composition. The oxygen barrier composition will often be used to form an oxygen barrier layer of a packaging article. The amount of the modified ethylene vinyl alcohol polymer in the oxygen barrier composition can be from about 1% to about 99%, preferably from about 2% to about 50%, more preferably from about 5% to about 20%, by weight. The balance of the oxygen barrier composition can comprise additives which are known for use in oxygen barrier compositions or, owing to the presence of oxygen scavenging functional groups, oxygen scavenging compositions.

Compounds can be added to modify the oxygen barrier functionality of the composition. For example, in one preferred embodiment, the modified EVOH polymers of the invention with a high weight percentage of R groups (i.e. greater than about 10 wt %) can be used to form a miscible blend with an unmodified EVOH polymer, in order to adjust barrier performance, physical properties, and process capability.

Compounds commonly used with oxygen scavenging polymers can be selected to enhance the oxygen scavenging functionality of the modified EVOH polymers in storage, processing into a layer of a packaging article, or use of the packaging article. Such enhancements include, but are not limited to, limiting the rate of oxygen scavenging by the oxygen scavenging groups of the modified EVOH prior to filling of the packaging article with a product, initiating oxygen scavenging by the oxygen scavenging groups of the modified EVOH at a desired time, or limiting the induction period (the period between initiating oxygen scavenging and scavenging of oxygen at a desired rate), among others. These compounds can be added to the oxygen barrier composition comprising the modified ethylene vinyl alcohol polymer, to provide benefits for oxygen scavenging by the oxygen scavenging functional group of the modified ethylene vinyl alcohol polymer.

Preferably, the oxygen barrier composition, an oxygen barrier layer formed from. the composition, or a packaging article comprising the oxygen barrier layer, comprises a transition metal catalyst. Though not to be bound by theory, useful catalysts include those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate or naphthenate. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the edible dietary intake (EDI)). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal catalyst may range from 0.001 to 1% (10 to 10,000 ppm) of the oxygen barrier composition, based on the metal content only (excluding ligands, counterions, etc.). In a packaging article, the transition metal catalyst can be formed in the high oxygen barrier layer or in a layer adjacent to the high oxygen barrier layer.

Another compound that is often preferably added to the oxygen barrier composition is a photoinitiator, or a blend of different photoinitiators, especially if antioxidants are included to prevent premature oxidation of the oxygen scavenging functional groups of the composition.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, αα-diethoxyacetophenone, and αα-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Use of a photoinitiator is preferable because it generally provides faster and more efficient initiation of oxygen scavenging by the oxygen scavenging functional groups of the modified ethylene vinyl alcohol polymer. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the EDI).

Photoinitiators that are especially useful in the present invention include benzophenone derivatives containing at least two benzophenone moieties, as described in U.S. Pat. No. 6,139,770. These compounds act as effective photoinitiators to initiate oxygen scavenging activity in oxygen scavenging compositions. Such benzophenone derivatives have a very low degree of extraction from oxygen barrier compositions, which may lead to reduced malodor or off-taste of a packaged food, beverage, or oral pharmaceutical product by extracted photoinitiator.

A "benzophenone moiety" is a substituted or unsubstituted benzophenone group.

Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_a(B)_b$$

wherein A is a bridging group selected from sulfur; oxygen; carbonyl; —SiR$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of B, herein R", when present, are individually selected from alkyl, aryl, alkoxy, phenoxy, or alicylic groups containing from 1 to 24 carbon atoms, or halides. Each benzophenone moiety can have from 0 to 9 substituents. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by the oxygen scavenging functional groups of the modified ethylene vinyl alcohol polymer upon exposure to radiation. The amount of photoinitiator can vary. In many instances, the amount will depend on the modified ethylene vinyl alcohol polymer used, the wavelength and intensity of UV radiation used, the nature and amount of antioxidants used, as well as the type of photoinitiator used. The amount of photoinitiator also depends on the intended use of the oxygen barrier layer. For instance, if the photoinitiator-containing component is placed underneath a layer which is somewhat opaque to the radiation used, more initiator may be needed. For most purposes, however, the amount of photoinitiator, when used, will be in the range of 0.01 to 10% by weight of the total oxygen barrier composition.

Antioxidants may be used in the composition to control scavenging initiation by the oxygen scavenging functional groups of the modified ethylene vinyl alcohol polymer. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the oxygen scavenging functional groups of the modified ethylene vinyl alcohol polymer in the packaging article, the packaging article (and any incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on the rate of oxygen scavenging by the oxygen scavenging functional groups of the oxygen barrier composition. As mentioned earlier, antioxidants are usually present in compositions comprising an oxidizable organic compound or a structural polymer to prevent oxidation or gelation of the polymers. Typically, they are present in about 0.01 to 1% by weight of the composition. However, additional amounts of antioxidant may also be added if it is desired to tailor the induction period as described above.

A structural polymer, such as polyethylene terephthalate (PET), can be included as well. Also, additives which can be included in the oxygen barrier layer include, but are not necessarily limited to, fillers, pigments, dyestuffs, stabilizers, processing aids, plasticizers, fire retardants, and anti-fog agents, among others.

Any other additives employed normally will not comprise more than 10% of the oxygen barrier composition by weight, with preferable amounts being less than 5% by weight of the composition.

In another embodiment, the present invention relates to a packaging article, comprising an oxygen barrier composition which comprises a modified ethylene vinyl alcohol polymer comprising an oxygen scavenging functional group. Preferably, the modified ethylene vinyl alcohol comprises structure I:

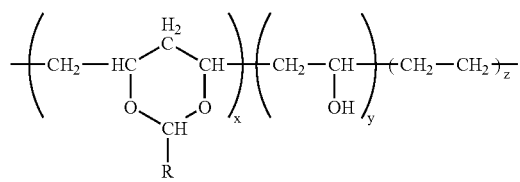

(I)

wherein x is an integer greater than or equal to 1, y is an integer greater than or equal to 0 (preferably greater than or equal to 1), and z is an integer greater than or equal to 0 (preferably greater than or equal to 1); and R is a cycloalkenyl group. Preferably, R has structure II:

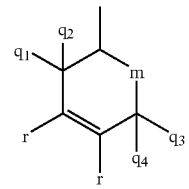

(II)

wherein $q_1$, $q_2$, $q_3$, $q_4$, and r are independently selected from hydrogen, methyl, or ethyl; m is $—(CH_2)_n—$, wherein n is an integer from 0 to 4, inclusive; and, when r is hydrogen, at least one of $q_1$, $q_2$, $q_3$, and $q_4$ is also hydrogen. Preferably, R is cyclohexenyl, i.e. n is 1 and $q_1$, $q_2$, $q_3$, $q_4$, and r are each hydrogen.

Again, in an alternative definition, the packaging article of the present invention preferably comprises a polymer, comprising structures IV, V, and VI:

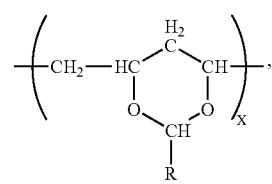

(IV)

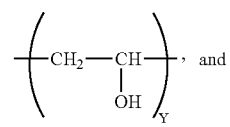

(V)

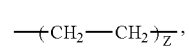

(VI)

wherein x is an integer greater than or equal to 1, y is an integer greater than or equal to 1, z is an integer greater than or equal to 1, and R is a cycloalkenyl group.

Preferably, R has structure II:

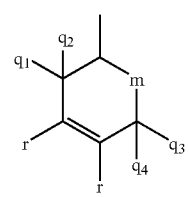

(II)

wherein $q_1$, $q_2$, $q_3$, $q_4$, and r are independently selected from hydrogen, methyl, or ethyl; m is $—(CH_2)_n—$, wherein n is an integer from 0 to 4, inclusive; and, when r is hydrogen, at least one of $q_1$, $q_2$, $q_3$, and $q_4$ is also hydrogen.

The oxygen barrier composition is as described above, and can include a transition metal catalyst, a photoinitiator, an antioxidant, an unmodified EVOH polymer, other additives, or any combination thereof. Preferably, the composition further comprises an unmodified EVOH polymer.

Packaging articles typically come in several forms including a single layer film, a multilayer film, a single layer rigid article, or a multilayer rigid article. Typical rigid or semi-rigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles either comprise single or multiple layers of material.

The oxygen barrier composition can be in the form of an oxygen barrier layer in a single-layer or multilayer packaging article. The additional layers of a multilayer packaging article may further comprise a structural layer or layers, a moisture barrier layer or layers, or a combination thereof.

In a structural layer, suitable structural polymers include, but are not limited to, polyethylene, low density polyethylene, very low density polyethylene, ultra-low density polyethylene, high density polyethylene, polypropylene, poly(ethylene terephthalate) (PET), poly(ethylene naphthalate) (PEN), ethylene-vinyl acetate, ethylene-alkyl (meth)acrylates, ethylene-(meth)acrylic acid, or ethylene-(meth)acrylic acid ionomers.

In a preferred embodiment, the packaging article comprises, from the exterior of the packaging article to the interior of the packaging article: an exterior structural layer comprising PET; the oxygen barrier layer comprising the modified EVOH; and an interior structural layer comprising PET. "Exterior" and "interior" structural layers, as used to describe this preferred embodiment, need not form the exterior surface or the interior surface of the packaging article. Also, other layers can be included, either to the exterior of the exterior structural layer, to the interior of the interior structural layer, or between the exterior structural layer and the oxygen barrier layer or between the interior structural layer and the oxygen barrier layer.

The packaging article comprising the oxygen barrier composition can be used to package any product for which it is desirable to inhibit oxygen damage during storage, e.g. food, beverage, pharmaceuticals, medical products, corrodible metals, or electronic devices. It is especially useful for packaging products for which it is desirable to maintain an oxygen barrier for a long period of time, e.g. beer, wine, and other beverages. It is also useful for packaging products for which it is desirable to retain carbon dioxide, e.g. beer, sparkling wine, and soft drinks.

The packaging article comprising the oxygen barrier composition can comprise a single layer comprising the composition (such layer may be referred to as an "oxygen barrier layer") or an oxygen barrier layer or layers and additional layers. Single layered packaging articles can be prepared by solvent casting, injection molding, blow molding, or extrusion. Packaging articles with multiple layers are typically prepared using coextrusion, injection molding, blow molding, coating, or lamination.

The additional layers of a multilayer material may further comprise at least one oxygen barrier layer, i.e. a layer having an oxygen transmission rate equal to or less than 500 cubic centimeters per square meter ($cc/m^2$) per day per atmosphere at room temperature (about 25° C.), wherein the oxygen barrier layer does not comprise a modified EVOH. Typical oxygen barriers comprise poly(ethylene vinyl alcohol), polyacrylonitrile, polyvinyl chloride, poly(vinylidene dichloride), polyethylene terephthalate, silica, polyamides, or mixtures thereof. However, because the oxygen barrier layer comprising the modified ethylene vinyl alcohol polymer inhibits oxygen transmission, the need for a separate oxygen barrier layer is reduced and may be dispensed with entirely, if desired.

If it is desired, a multilayer packaging article can comprise an oxygen scavenging layer, comprising an oxygen scavenging polymer and, optionally, other additives, such as a photoinitiator, a transition metal catalyst, an antioxidant, a structural polymer, or others, alone or in any combination. The oxygen scavenging layer can be an integral part of the packaging article, or it can be a liner, coating, sealant, gasket, adhesive insert, non-adhesive insert, or fibrous mat insert in the packaging article.

Other additional layers of the packaging article may include one or more layers which are permeable to oxygen (an "oxygen permeable layer") and are located on the interior surface of the packaging article, i.e. between the packaged product and the oxygen barrier layer, or the oxygen scavenging layer, if any. In one packaging article, preferred for flexible packaging of food, the layers include, in order starting from the outside of the package to the innermost layer of the package, (i) an oxygen barrier layer comprising the modified EVOH of the invention, (ii) an optional oxygen scavenging layer, and (iii) an optional oxygen-permeable layer. Control of the oxygen barrier property of (i) allows regulation of the scavenging life of the oxygen scavenging layer by limiting the rate of oxygen entry to the oxygen scavenging moieties in layer (ii), and thus slows the consumption of oxygen scavenging capacity. Control of the oxygen permeability of layer (iii) allows setting the rate of oxygen scavenging for the overall structure independent of the composition of the scavenging component (ii). Furthermore, layer (iii) can provide a barrier to migration of the components of the high oxygen barrier layer, the scavenging layer, or by-products of scavenging or oxygen barrier activity, into the package interior. Even further, layer (iii) can improve the heat-sealability, clarity, or resistance to blocking of the multilayer packaging article.

Another layer that can be included in the packaging article is a moisture barrier layer. A moisture barrier layer is typically included to minimize wetting of the oxygen barrier layer of the invention, because the barrier property of a layer comprising EVOH is somewhat reduced in the layer is wetted. Multiple moisture barrier layers, such as one located to the exterior of the oxygen barrier layer and one located to the interior of the oxygen barrier layer, can be used. Polyolefins (e.g. polyethylene), PET, or both can be used as major components of a moisture barrier layer. PET is especially useful in a rigid packaging article application.

Further additional layers, such as adhesive layers, may also be used. Compositions typically used for adhesive layers include anhydride functional polyolefins and other well-known adhesive layers.

In another embodiment, the present invention is directed to a method of making a modified ethylene vinyl alcohol polymer (EVOH) comprising an oxygen scavenging functional group. Preferably, the modified EVOH comprises structure I:

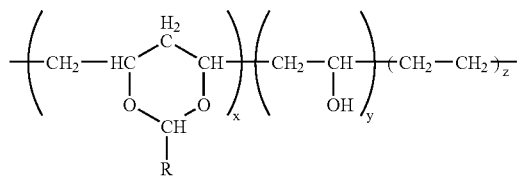
(I)

wherein x is an integer greater than or equal to 1, y is an integer greater than or equal to 0 (preferably greater than or equal to 1), and z is an integer greater than or equal to 0 (preferably greater than or equal to 1); and R is a cycloalkenyl group. Preferably, R has structure II:

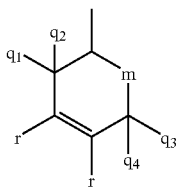
(II)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen. Preferably, n is 1 and $q_1$, $q_2$, $q_3$, $q_4$, and r are each hydrogen.

An alternative way of defining the preferred modified EVOH is as a polymer, comprising structures IV, V, and VI:

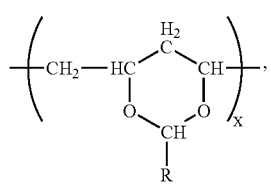
(IV)

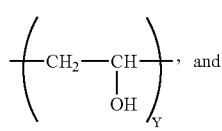
(V)

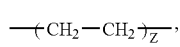
(VI)

wherein x is an integer greater than or equal to 1, y is an integer greater than or equal to 1, z is an integer greater than or equal to 1, and R is a cycloalkenyl group. Preferably, R has structure II:

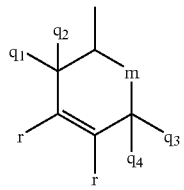
(II)

wherein $q_1$, $q_2$, $q_3$, $q_4$, and r are independently selected from hydrogen, methyl, or ethyl; m is —$(CH_2)_n$—wherein n is an integer from 0 to 4, inclusive; and, when r is hydrogen, at least one of $q_1$, $q_2$, $q_3$, and $q_4$ is also hydrogen.

The method comprises (i) providing (a) an ethylene vinyl alcohol copolymer and (b) an aldehyde comprising an olefinic or benzylic group. Preferably, the aldehyde has structure III:

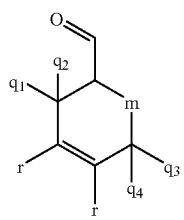
(III)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen. The method also comprises using (c) a catalyst; and (ii) reacting the ethylene vinyl alcohol copolymer and the aldehyde in the presence of the catalyst under temperature and pressure sufficient to form the modified ethylene vinyl alcohol polymer.

The providing step involves the combination of the ethylene vinyl alcohol copolymer, the aldehyde, and the catalyst.

The ethylene vinyl alcohol copolymer can be from any source and have any proportion of ethylene and vinyl alcohol units. A poly(vinyl alcohol), i.e. an ethylene vinyl alcohol copolymer comprising about 0 mole % ethylene, is within the scope of "ethylene vinyl alcohol copolymer" with regard to this embodiment of the present invention. It should be noted that the lower the proportion of vinyl alcohol units in the copolymer, the lower the proportion of vinyl acetal units that can be formed in the method. However, if very high proportions of vinyl acetal units are formed, the physical barrier properties characteristic to EVOH polymer may be impaired. This can be remedied by forming a miscible blend of the modified EVOH polymers with a high proportion of vinyl acetal units and unmodified EVOH polymers as described above, which provides a desirable physical barrier to oxygen entry and also efficient oxygen scavenging performance. Even if the physical barrier properties of the modified EVOH are adequate, a blend with an unmodified EVOH polymer is still within the scope of the invention.

Typical commercially-available ethylene vinyl alcohol copolymers comprise from about 27 mole % to about 48 mole % ethylene, with the balance being vinyl alcohol. Optionally, poly(vinyl alcohol) can also be used as the starting material to incorporate the oxygen scavenging functional group in forming the oxygen barrier composition. Such commercially-available ethylene/vinyl alcohol copolymers or poly(vinyl alcohol) polymer have proportions of vinyl alcohol units that can yield desirable proportions of vinyl acetal units upon performance of the method.

Regarding the aldehyde, more preferably, in structure III, n is 1, and $q_1$, $q_2$, $q_3$, $q_4$, and r are each hydrogen; i.e. the aldehyde is tetrahydrobenzaldehyde (THBE).

The catalyst can be any catalyst known to promote the condensation reaction of the aldehyde and the EVOH copolymer. Typically, the catalyst is a mineral acid, such as. hydrochloric acid, hydrofluoric acid, a transition metal catalyst, sulfuric acid, or toluene sulfonic acid. Sulfuric acid is preferred. A typical concentration of catalyst is 2 parts by weight per 100 parts of the EVOH copolymer, although other concentrations that lead to a desired degree of modification of the EVOH copolymer can be used.

After the EVOH copolymer, the aldehyde, and the catalyst are combined, the reaction can take place. The reaction proceeds by the catalyzed condensation reaction between the available 1,3-diol structure units from EVOH and the aldehyde. As a result, the oxygen scavenging functional functional group is attached to the EVOH polymer through an acetal linkage. The reaction can occur either as a batch process or a continuous process, in view of the description below.

Typically, the reaction takes place by either a solvent or suspension process. In the solvent process, the EVOH copolymer, the aldehyde, and the catalyst are dissolved in an appropriate solvent, such as acetic acid, water, ethanol, or a mixture thereof.

In the suspension process, the EVOH copolymer, the aldehyde, and the catalyst are provided along with a suspending agent such as polyvinyl alcohol, starch, gelatin, calcium phosphate, poly(acrylic acid) salts, gum arabic, or gum tragacanth, can be used. A preferred suspending agent is polyvinyl alcohol. The suspending agent allows the formation of droplets of the EVOH copolymer and the aldehyde, and thus reduces the need for an organic solvent.

Alternatively, the reaction can take place in a melt by a bulk process, or by a reactive extrusion process.

The reaction can take place at any temperature conducive to the condensation reaction.

If the reaction takes place in a solvent or a suspension, the pressure can be at any pressure of about 1 atm or greater, but conveniently the reaction vessel is in equilibrium with atmospheric pressure and is about 1 atm.

Typically, upon completion of the reaction, the mineral acid catalyst is neutralized by the addition of an equivalent or excess amount of a neutralizing agent, such as sodium acetate.

The result of the reaction is a polymer comprising a modified EVOH polymer, as. well as by-products which may include unreacted aldehyde, salts generated by neutralization of the mineral acid, and condensation by-products, typically water. Any such by-products can be removed, if desired, by any appropriate technique known in the art, such as evaporation under heat or vacuum.

Another technique by which the modified EVOH can be made is adapted from a technique for the synthesis of EVOH. Ethylene vinyl acetate copolymer (EVA) can be readily made by the polymerization of ethylene and vinyl acetate, using techniques known in the art. Thereafter, EVOH can be generated by hydrolyzing EVA in an aqueous solution. Appropriate temperature, pressure, and other parameters of the hydrolysis reaction are known to one of skill in the art.

According to this embodiment, the technique for the synthesis of the modified EVOH follows the above process until EVA is formed. Thereafter, when hydrolysis is performed on the EVA in aqueous solution, generating EVOH, the aldehyde, such as THBE, is subsequently added to the EVOH solution and the conversion to the modified EVOH is performed before the EVOH is purified from the solution.

In another embodiment, the present invention is directed to a method of forming a packaging article with at least an oxygen barrier layer, comprising:

(i) providing an oxygen barrier composition comprising a modified ethylene vinyl alcohol polymer, preferably a modified ethylene vinyl alcohol polymer comprising the structure I:

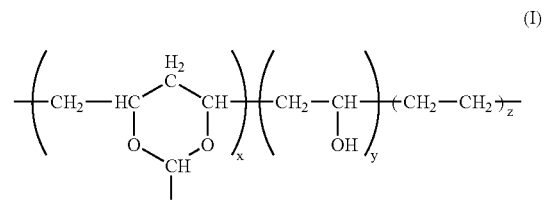

(I)

wherein x is an integer greater than or equal to 1, y is an integer greater than or equal to 0, preferably greater than or equal to 1, and z is an integer greater than or equal to 0, preferably greater than or equal to 1; and R is a cycloalkenyl group. Preferably, R has structure II:

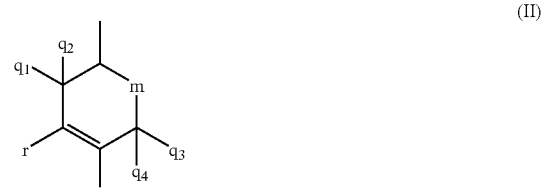

(II)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen; and (ii) forming the oxygen barrier composition into a layer or layers of the packaging article.

Again, the preferred modified EVOH can also be defined as a polymer, comprising structures IV, V, and VI:

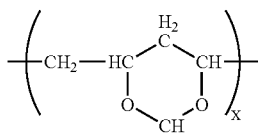

(IV)

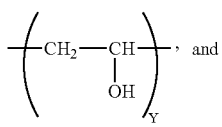

(V)

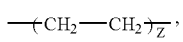

(VI)

wherein x is an integer greater than or equal to 1, y is an integer greater than or equal to 1, z is an integer greater than or equal to 1, and R is a cycloalkenyl group. Preferably, R has structure II:

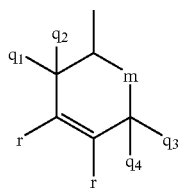

(II)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

The modified ethylene vinyl alcohol polymer, the oxygen barrier composition, and the packaging article are as described above. Preferably, the modified ethylene vinyl alcohol polymer is chosen such that n is 1 and $q_1$, $q_2$, $q_3$, $q_4$, and r are hydrogen.

The forming step can be by any appropriate technique depending on the oxygen barrier composition, the packaging article, and other parameters. As mentioned above, single layered packaging articles typically can be prepared by solvent casting, injection molding, blow molding, or extrusion, among others. Packaging articles with multiple layers are typically prepared using coextrusion, injection molding, blow molding, stretch blow molding, coating, or lamination, among others.

If a transition metal catalyst is desired for inclusion in the packaging article, to catalyze oxygen scavenging by the oxygen scavenging functional groups of the oxygen barrier composition, the forming step comprises forming a transition metal catalyst into the oxygen barrier layer or a layer adjacent to the oxygen barrier layer of the packaging article.

The oxygen barrier composition can also comprise a photoinitiator, an antioxidant, a structural polymer, or other additives as described above. Preferably, the oxygen barrier composition comprises a blend of the modified EVOH and an unmodified EVOH.

In addition to the oxygen barrier layer, the packaging article to be formed can comprise other layers, such as an oxygen barrier layer not comprising the modified EVOH, a structural layer, an oxygen scavenging layer, or an oxygen-permeable layer in the packaging article to the interior of the oxygen scavenging layer. Depending on the desired form of the packaging article, the forming step can comprise forming the packaging article as a single layer film, a multilayer film, a single layer rigid article, or a multilayer rigid article.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

In the following examples, the EVOH used (Eval F101A, from Evalca Inc.) contained 32% mole ethylene content and had a melt index of 3.6 g/10 min at 21° C. and a loading of 2.16 kg, and a melting point of 183° C. For synthesis of the modified EVOH, EVOH (Eval F 101A) was used as is. For compounding and extrusion, EVOH was dried at 90° C. for 12 hours under vacuum to remove the moisture. The tetrahydrobenzaldehyde was obtained from Diacel Corp. of Japan.

Example 1

To a reactor equipped with a mechanical stirrer, nitrogen inlet and external heating, 250 parts water, 500 parts acetic acid, 500 parts ethyl alcohol, and 100 parts poly(ethylene vinyl alcohol) (68% alcohol content) were charged. The mixture was heated to gentle reflux at 90° C. to allow the polymer to completely dissolve in the solution. Then, 5 parts tetrahydrobenzaldehyde were charged. This was followed by charging 2 parts sulfuric acid drop-wise into the content. The reaction content was maintained at 90° C. under stirring for 6 hours. At the end of the reaction, the solution was allowed to cool to room temperature overnight. The solution was neutralized by adding 60 mL of sodium acetate solution (25%). It was stirred for about 1 hour. The reaction solution was slowly added into 4 L acetone under vigorous stirring to result in precipitation. The product was washed in acetone for 2 hours under vigorous agitation, and the product was collected in a white fibrous form by filtration. The product was rinsed with 2×1 L acetone. The product obtained from the rinsing step was re-dissolved in 1.8 L ethyl alcohol and the obtained solution was added slowly into 4 L acetone to precipitate the product. The product was typically dried at 50° C. in a vacuum oven for 24 hr. This gave 111 g product: Tg=60° C.; Tm=133° C. (DSC, 10° C./min).

Example 2

Similarly to Example 1, 500 parts water, 500 parts ethyl alcohol, 100 parts poly(ethylene vinyl alcohol) (68% alcohol content), and 10 parts tetrahydrobenzaldehyde were used. This gave 113 g product: Tg=60° C.; Tm=110° C. (DSC, 10° C./min).

Example 3

Similarly to Example 1, 500 parts water, 500 parts ethyl alcohol, 100 parts poly(ethylene vinyl alcohol) (68% alcohol content), and 20 parts tetrahydrobenzaldehyde were used. This gave 120 g product: Tg=64° C. (DSC, 10° C./min).

Example 4

Similarly to Example 1, 500 parts water, 500 parts ethyl alcohol, 100 parts poly(ethylene vinyl alcohol) (68% alcohol content), and 30 parts tetrahydrobenzaldehyde were used. This gave 137 g product: Tg=60° C. (DSC, 10° C./min).

Example 5

Similarly to Example 1, 500 parts water, 500 parts ethyl alcohol, 100 parts poly(ethylene vinyl alcohol) (68% alcohol content), and 40 parts tetrahydrobenzaldehyde were used. This gave 143 g product: Tg=65° C. (DSC, 10° C./min).

Example 6

Similarly to Example 1, 500 parts water, 500 parts ethyl alcohol, 100 parts poly(ethylene vinyl alcohol) (68% alcohol content), and 60 parts tetrahydrobenzaldehyde were used. This gave 127 g product: Tg=65° C. (DSC, 10° C./min).

Example 7

Film Casting

The polymer obtained according to any one of Examples 1-6 was converted into a strand on a Hakke twin screw extruder at temperature range of 170° C. to 200° C., then palletized on a strand cutter. A series of dry blends were prepared from the obtained pellets of modified ethylene-vinyl alcohol copolymer, ethylene-vinyl alcohol and cobalt masterbatch (containing 1 wt % tribenzoyl triphenylbenzene and 0.5 wt % cobalt as cobalt oleate in EVOH ) by mixing in a polyethylene bag. The blends differed in the weight ratio of modified ethylene-vinyl alcohol copolymer, ethylene-vinyl alcohol (Eval F101A) and masterbatch, with typical master batch concentration from 5-20 wt %. The dry blends were compounded on a Hakke twin screw extruder at temperature range of 170° C. to 220° C. at 30 rpm screw speed (Table 1). The temperature for film casting on Randcastle extruder was about 220° C. Exemplary blend compositions are given below.

TABLE 1

Blend Composition

| Material | EVOH, % by wt | Modified EVOH* % by wt | Masterbatch % by wt | Cobalt Concentration ppm |
|---|---|---|---|---|
| Sample A | 100 | 0 | 0 | 0 |
| Sample B | 70 | 20 | 10 | 500 |
| Sample C | 60 | 20 | 20 | 1000 |

*Modified EVOH was obtained from Example 5.

Example 8

Oxygen Permeability

Films prepared according to Example 7 were tested for oxygen permeability using a Mocon Ox-Trans 2/20 ML system at 23° C. Nitrogen containing 2% hydrogen was used as carrier gas to flush both sides of the film at 10 cc/min flow rate for one to three days before testing. Air was used as test gas at 10 cc/min flow rate. The oxygen permeability was measured in cubic centimeters per $m^2$ per 24 hours. The films were tested typically within a few days after being made.

TABLE 2

Oxygen Permeability vs. Layer Composition in Multilayer Films

| Sample | Layer Composition | Individual Layer Thickness (mil) | Modified EVOH in core layer (% w.t.) | Co concentration core-layer (ppm) | $O_2$ Transmission Rate** cc/($m^2$.Day) |
|---|---|---|---|---|---|
| Sample D | PE/Sample A*/PE | 1.0/1.0/1.0 | 0 | 0 | 0.59 |
| Sample E | PE/Sample B*/PE | 1.0/1.0/1.0 | 20 | 500 | 0 |
| Sample F | PE/Sample C*/PE | 1.0/1.0/1.0 | 20 | 1000 | 0 |

*Sample A, B and C are from example 7.
**The zero reading of oxygen transmission rate refers to a reading below the detection limit of the Oxtran.

CONCLUSIONS

One approach in achieving improved oxygen barrier performance is to blend in a minor amount of a modified EVOH according to the present invention with a commercially available EVOH copolymer in the presence of an oxidation catalyst. Based on the results shown in Table 2, it is evident that the presence of a modified EVOH according to the present invention in the EVOH barrier layer can significantly enhance the oxygen barrier performance. Since the EVOH is only partially modified, the modified EVOH still maintained the characteristics of EVOH, and hence, was sufficiently compatible with EVOH copolymer. This ensured the desired dispersion of oxygen scavenging EVOH (modified EVOH) in the EVOH matrix and maintained desirable optical clarity of the extruded films. This approach did not require the retention of a physical barrier property (passive barrier) from the modified EVOH since the unmodified EVOH in the blend provided the passive barrier property. The main attribute from the relatively low amount of modified EVOH in the blend is the scavenging action in eliminating the fugitive oxygen, which enhanced the overall oxygen barrier property of the blend composition in the barrier layer.

An alternative approach is to use the modified EVOH as the major component in. the barrier layer structure, without additional commercial EVOH. In this case, the enhanced oxygen barrier performance was most effectively achieved when the modification level was kept at a relatively low level (data not shown). We believe this is due to a structural disruption caused by high level modification, which leads to detrimental effects on the passive oxygen barrier property characteristics of EVOH. This structural disruption was indicated by the DSC analysis of the modified EVOH (Examples 1-6). A significant depression in crystallinity (represented by decreased Tg) was observed from the high level modification of EVOH. In Example 5, a totally amorphous polymer was obtained when 100 parts EVOH were modified by 40 parts tetrahydrobenzaldehyde. It is well known that the crystalline characteristic of EVOH is a major contributor to the high oxygen barrier property of EVOH.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen barrier composition comprising a blend of (i) a modified ethylene vinyl alcohol polymer (EVOH) comprising an oxygen scavenging functional group and (ii) an unmodified EVOH; wherein the modified EVOH comprises structures IV, V, and VI:

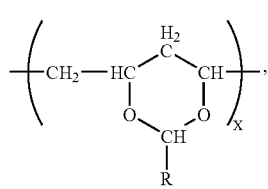

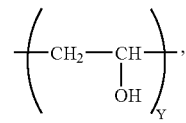

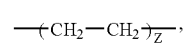

wherein X is an integer greater than or equal to 1, Y is an integer greater than or equal to 1, Z is an integer greater than or equal to 1, and R comprises a cycloalkenyl group; and wherein the blend comprises from about 5 wt % to about 20 wt % modified EVOH.

2. The oxygen barrier composition of claim 1, wherein R has structure II:

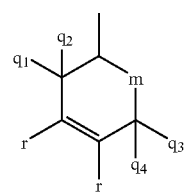

wherein $q_1$, $q_2$, $q_3$, $q_4$, and r are independently selected from hydrogen, methyl, or ethyl; m is $-(CH_2)_n-$, wherein n is an integer from 0 to 4, inclusive; and, when r is hydrogen, at least one of $q_1$, $q_2$, $q_3$, and $q_4$ is also hydrogen.

3. The oxygen barrier composition of claim 2, wherein Y is greater than or equal to 1, Z is greater than or equal to 1, n is 1, and $q_1$, $q_2$, $q_3$, $q_4$, and r are hydrogen.

4. The oxygen barrier composition of claim 1, further comprising a transition metal catalyst.

5. The oxygen barrier composition of claim 4, wherein the transition metal catalyst is a cobalt salt.

6. The oxygen barrier composition of claim 5, wherein the cobalt salt is selected from cobalt oleate, cobalt stearate, or cobalt neodecanoate.

7. The oxygen barrier composition of claim 1, further comprising a photoinitiator.

8. The oxygen barrier composition of claim 7, wherein the photoinitiator is selected from benzophenone derivatives containing at least two benzophenone moieties and having the formula:

$$A_a(B)_b$$

wherein A is a bridging group selected from sulfur, oxygen, carbonyl, $-SiR''_2-$ wherein each R'' is individually selected from alkyl groups containing from 1 to 12 carbon atoms, aryl groups containing 6 to 12 carbon atoms, or alkoxy groups containing from 1 to 12 carbon atoms, $-NR'''-$ wherein R''' is an alkyl group containing 1 to 12 carbon atoms, an aryl group containing 6 to 12 carbon atoms, or hydrogen, or an organic group containing from 1 to 50 carbon atoms;

a is an integer from 0 to 11;

B is a substituted or unsubstituted benzophenone group; and b is an integer from 2 to 12.

9. The oxygen barrier composition of claim 8, wherein the photoinitiator is selected from dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, and substituted benzoylated styrene oligomer.

10. The oxygen barrier composition of claim 1, further comprising an antioxidant.

11. The oxygen barrier composition of claim 10, wherein the antioxidant is selected from 2,6-di(t-butyl)-4-methylphenol(BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, or dilaurylthiodipropionate.

* * * * *